United States Patent
Dowdall et al.

(10) Patent No.: US 9,495,875 B2
(45) Date of Patent: Nov. 15, 2016

(54) OBSTACLE EVALUATION TECHNIQUE

(71) Applicant: Google Inc., Mountain View, CA (US)

(72) Inventors: Jonathan Baldwin Dowdall, Oakland, CA (US); Jiajun Zhu, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/296,670

(22) Filed: Jun. 5, 2014

(65) Prior Publication Data

US 2014/0288817 A1    Sep. 25, 2014

Related U.S. Application Data

(62) Division of application No. 13/489,794, filed on Jun. 6, 2012, now Pat. No. 8,781,721.

(51) Int. Cl.
| | |
|---|---|
| *B60R 21/00* | (2006.01) |
| *B60R 21/013* | (2006.01) |
| *B60W 30/095* | (2012.01) |
| *B60W 30/08* | (2012.01) |
| *G08G 1/16* | (2006.01) |
| *G06K 9/00* | (2006.01) |

(52) U.S. Cl.
CPC ............... *G08G 1/166* (2013.01); *B60R 21/00* (2013.01); *B60R 21/013* (2013.01); *B60W 30/08* (2013.01); *B60W 30/095* (2013.01); *G06K 9/00805* (2013.01)

(58) Field of Classification Search
CPC  B60R 21/00; B60R 21/013; G06K 9/00805; G08G 1/166; B60W 30/095; B60W 30/08
USPC .................... 701/300–301; 340/436
See application file for complete search history.

(56) References Cited

U.S. PATENT DOCUMENTS

| | | | |
|---|---|---|---|
| 5,617,199 A | 4/1997 | Dunne | |
| 6,169,572 B1 | 1/2001 | Sogawa | |
| 2003/0173127 A1 | 9/2003 | Noecker | |
| 2005/0240330 A1* | 10/2005 | Heinrichs-Bartscher | B60K 31/0008 701/48 |
| 2006/0293856 A1* | 12/2006 | Foessel | B60W 30/09 701/301 |
| 2007/0276600 A1 | 11/2007 | King | |
| 2009/0079839 A1 | 3/2009 | Fischer | |
| 2009/0254235 A1 | 10/2009 | Kuroda | |
| 2010/0098297 A1* | 4/2010 | Zhang | 382/104 |
| 2010/0222954 A1 | 9/2010 | Ichinose | |
| 2011/0093177 A1 | 4/2011 | Horn | |
| 2012/0299766 A1* | 11/2012 | Mizutani | G01S 13/42 342/118 |

FOREIGN PATENT DOCUMENTS

WO    WO 2009 033286    3/2009

* cited by examiner

*Primary Examiner* — Nga X Nguyen
(74) *Attorney, Agent, or Firm* — McDonnell Boehnen Hulbert and Berghoff LLP

(57) ABSTRACT

A vehicle configured to operate in an autonomous mode may engage in an obstacle evaluation technique that includes employing a sensor system to collect data relating to a plurality of obstacles, identifying from the plurality of obstacles an obstacle pair including a first obstacle and a second obstacle, engaging in an evaluation process by comparing the data collected for the first obstacle to the data collected for the second obstacle, and in response to engaging in the evaluation process, making a determination of whether the first obstacle and the second obstacle are two separate obstacles.

18 Claims, 7 Drawing Sheets

OBSTACLE EVALUATION TECHNIQUE

CROSS REFERENCE TO RELATED APPLICATION

The present application is a divisional of and claims priority to U.S. patent application Ser. No. 13/489,794 filed on Jun. 6, 2012 and titled "Obstacle Evaluation Technique," the entire contents of which are herein incorporated by reference.

BACKGROUND

Unless otherwise indicated herein, the materials described in this section are not prior art to the claims in this application and are not admitted to be prior art by inclusion in this section.

Generally, a vehicle is a powered, movable machine. Examples of vehicles include cars, trucks, motorcycles, buses, bicycles, etc. Vehicles can be utilized for various tasks such as transportation of people and cargo, as well as many other uses.

Some vehicles may be partially or fully automated. For instance, when a vehicle is in an automated mode, some or all of the driving aspects of vehicle operation can be handled by a vehicle control system. In such cases, computing devices located on-board and/or in a server network could be operable to carry out functions such as planning a driving route, sensing aspects of the vehicle, sensing the environment of the vehicle, and controlling drive components such as steering, throttle, and brake. Thus, autonomous vehicles may reduce the need for human interaction in various aspects of vehicle operation.

SUMMARY

In operation, an autonomous vehicle sensor system may analyze the environment of the vehicle and detect the presence of certain obstacles, such as other cars. Based on the positions or other characteristics of the detected obstacles, the vehicle may classify some obstacles as just parts of one large obstacle, and other obstacles as separate and distinct obstacles. However, in some situations, these classifications may be erroneous. For example, when two cars are positioned side-by-side or when a motorcycle is passing a semi-truck, a vehicle system may erroneously classify each of these obstacle pairs as just one large obstacle as a result of their close proximity.

Therefore, to address situations like this, and perhaps other situations, disclosed herein are methods and systems in which a vehicle engages in an advanced obstacle evaluation technique. More particularly, a vehicle may collect a history of data for at least two obstacles. Such data may be related to the speed, distance, orientation, or some other characteristic of each obstacle. The vehicle may then compare this historical data and determine whether one the two obstacles has taken some action that is inconsistent with the two obstacles being parts of one large obstacle (e.g., a lane change). Depending on the result of the comparison, the vehicle may classify the two obstacles as one large obstacle or two separate obstacles, as the case may be. Other examples of obstacle evaluation techniques are possible as well.

For example, in accordance with one embodiment, a method is provided and includes a vehicle system employing at least one sensor to collect data relating to a plurality of obstacles, identifying from the plurality of obstacles an obstacle pair including a first obstacle and a second obstacle, engaging in an evaluation process by comparing the data collected for the first obstacle to the data collected for the second obstacle, and based on the evaluation process, making a determination of whether the first obstacle and the second obstacle are two separate obstacles.

In accordance with another embodiment, another method is provided and includes a vehicle system using a sensor system to collect data for a first obstacle and a second obstacle including at least one of speed data, distance data, and orientation data, engaging in a first evaluation process by comparing the collected data and determining whether a first threshold is met, based on the first evaluation process, the vehicle system making a first determination of whether the first obstacle and the second obstacle are two separate obstacles, detecting that one or more environmental conditions have changed and responsively changing the first threshold to a second threshold, engaging in a second evaluation process by comparing the collected data and determining whether the second threshold is met, and based on the second evaluation process, making a second determination of whether the first obstacle and the second obstacle are two separate obstacles.

In accordance with another embodiment, a vehicle is provided and includes at least one sensor, at least one processor, and data storage comprising instructions executable by the at least one processor to receive from the at least one sensor data relating to a plurality of potential obstacles, conduct at least one evaluation on a pair of potential obstacles in the plurality of potential obstacles including a threshold comparison of the received data, classify the pair of potential obstacles as a single obstacle when the evaluation indicates that no threshold comparison of the received data is met, and classify the pair of potential obstacles as two separate obstacles when the evaluation indicates that at least one threshold comparison of the received data is met.

In accordance with another embodiment, a non-transitory computer readable medium (CRM) is disclosed. This CRM has stored thereon instructions executable by a computing device to cause the computing device to perform functions, which may include employing at least one sensor to collect data relating to a plurality of obstacles, identifying from the plurality of obstacles an obstacle pair including a first obstacle and a second obstacle, engaging in an evaluation process by comparing the data collected for the first obstacle to the data collected for the second obstacle, and based on the evaluation process, making a determination of whether the first obstacle and the second obstacle are two separate obstacles.

The foregoing summary is illustrative and is not intended to be in any way limiting. In addition to these illustrative aspects, embodiments, and features described above, further aspects, embodiments, and features will become apparent by reference to the figures and the following detailed description.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Example embodiments disclosed herein relate to operating a vehicle in an autonomous mode; and in particular, engaging in at least one obstacle evaluation technique in order to determine whether two obstacles are two separate obstacles (e.g., two cars), or whether they are parts of one large obstacle (e.g., two parts of a large truck).

Within the context of the disclosure, the vehicle could be operable in various modes of operation. In at least one embodiment, such modes of operation include manual, semi-autonomous, and autonomous modes. In particular, the autonomous mode may provide driving operation with little or no user interaction. Manual and semi-autonomous modes of operation could include greater degrees of user interaction.

Some methods disclosed herein could be carried out in part or in full by a vehicle configured to operate in an autonomous mode with or without external interaction (e.g., such as from a user of the vehicle). Other methods disclosed herein could be carried out in part or in full by a server. Those skilled in the art will understand that there are many different specific methods and systems that could be used during the operation of a vehicle. Each of these specific methods and systems are contemplated herein, and several example embodiments are described below.

Figure 1:
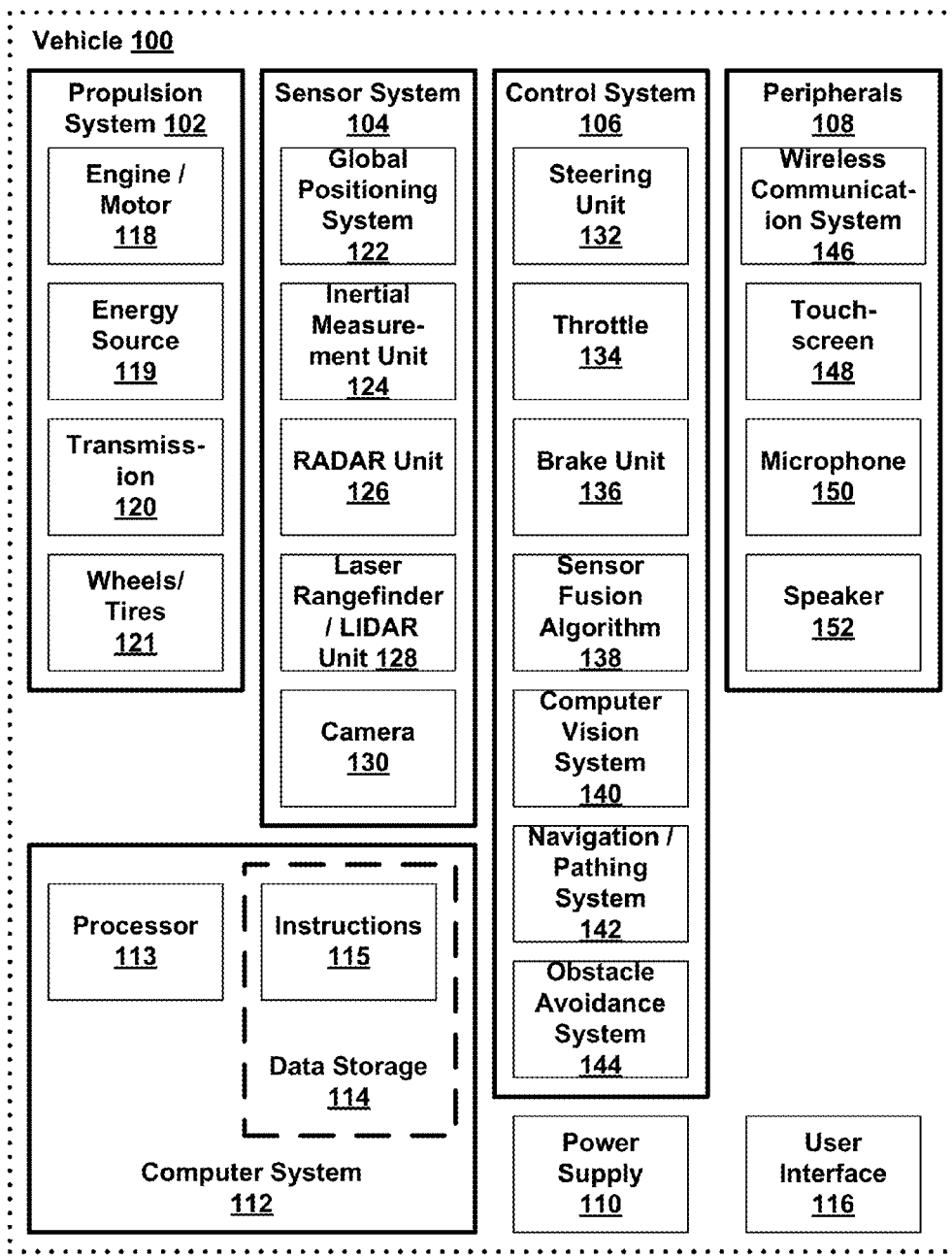
FIG. 1 is a block diagram depicting a vehicle, according to an example embodiment.

FIG. 1 is a functional block diagram illustrating a vehicle 100, according to an example embodiment. The vehicle 100 could be configured to operate fully or partially in an autonomous mode. For example, the vehicle 100 could control itself while in the autonomous mode, and may be operable to engage in an evaluation process (among other processes), in accordance with the description set forth herein. While in autonomous mode, the vehicle 100 may operate without human interaction.

The vehicle 100 could include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. To this end, the transmission 120 could include a gearbox, clutch, differential, and drive shafts. The transmission 120 could include other elements as well. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, or another combination of materials. In other embodiments, other locomotion schemes are possible either in combination with wheels/tires 121 or in substitution thereof, including, for example, tracks, treads, skis, or others.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the vehicle 100. To this end, GPS 122 could include a transceiver operable to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode. The camera 130 could include one or more devices configured to capture a plurality of images of the environment of the vehicle 100. The camera 130 could be a still camera or a video camera.

The control system 106 may be configured to control operation of the vehicle 100 and its components. Accordingly, the control system 106 could include various elements, such as steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100.

The throttle 134 could be configured to control, for instance, the operating speed of the engine/motor 118 and, in turn, control the speed of the vehicle 100.

The brake unit 136 could include any combination of mechanisms configured to decelerate the vehicle 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of vehicle 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured, perhaps in combination with elements of other vehicle systems, to map an environment, track objects, estimate obstacle speeds, estimate distances between various obstacles and between an obstacle and vehicle 100, estimate heading and/or orientation of an obstacle (i.e., the direction in which an obstacle is facing or traveling, measured, for example, on a 360 degree scale), or other characteristics of obstacles.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described. Peripherals 108 may be configured to allow interaction between the vehicle 100 and external sensors, other vehicles, other computer systems, and/or a user. For example, peripherals 108 could include a wireless communication system 146, a touchscreen 148, a microphone 150, and/or a speaker 152.

In an example embodiment, the peripherals 108 could provide, for instance, means for a user of the vehicle 100 to interact with the user interface 116. To this end, the touchscreen 148 could provide information to a user of vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to the user of the vehicle 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion, lead-acid battery, or even a fixed power supply, such as a 120 Volt Alternating Current power supply. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the vehicle 100 and its subsystems.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The environment could include, among other things, another vehicle. The computer vision system 140 could recognize the other vehicle as such based on object recognition models stored in data storage 114, or other techniques.

The computer system 112 could carry out several determinations based this information about the state of the environment of vehicle 100. For example, the computer system 112 could determine one or more predicted behaviors of the other vehicle. The predicted behavior could be based on several factors including the current state of the vehicle 100 (e.g., vehicle speed, current lane, etc.) and the current state of the environment of the vehicle 100 (e.g., speed limit, number of available lanes, position and relative motion of other vehicles, etc.).

In some embodiments, the computer system 112 interfaces with data storage 114 and other systems in order to control the control system 106 based on at least on the predicted behavior, the current state of the vehicle 100, and the current state of the environment of the vehicle 100. For example, in one situation, the computer system 112 may elect to adjust nothing as the likelihood of the other vehicle staying in its own lane is high. In another situation, however, the computer system 112 may elect to control vehicle 100 to slow down slightly (by reducing throttle 134) or to shift slightly to one direction or another (by controlling steering unit 132) within the current lane in order to avoid a potential collision. Other examples of interconnection between the components of vehicle 100 are numerous and possible within the context of the disclosure.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
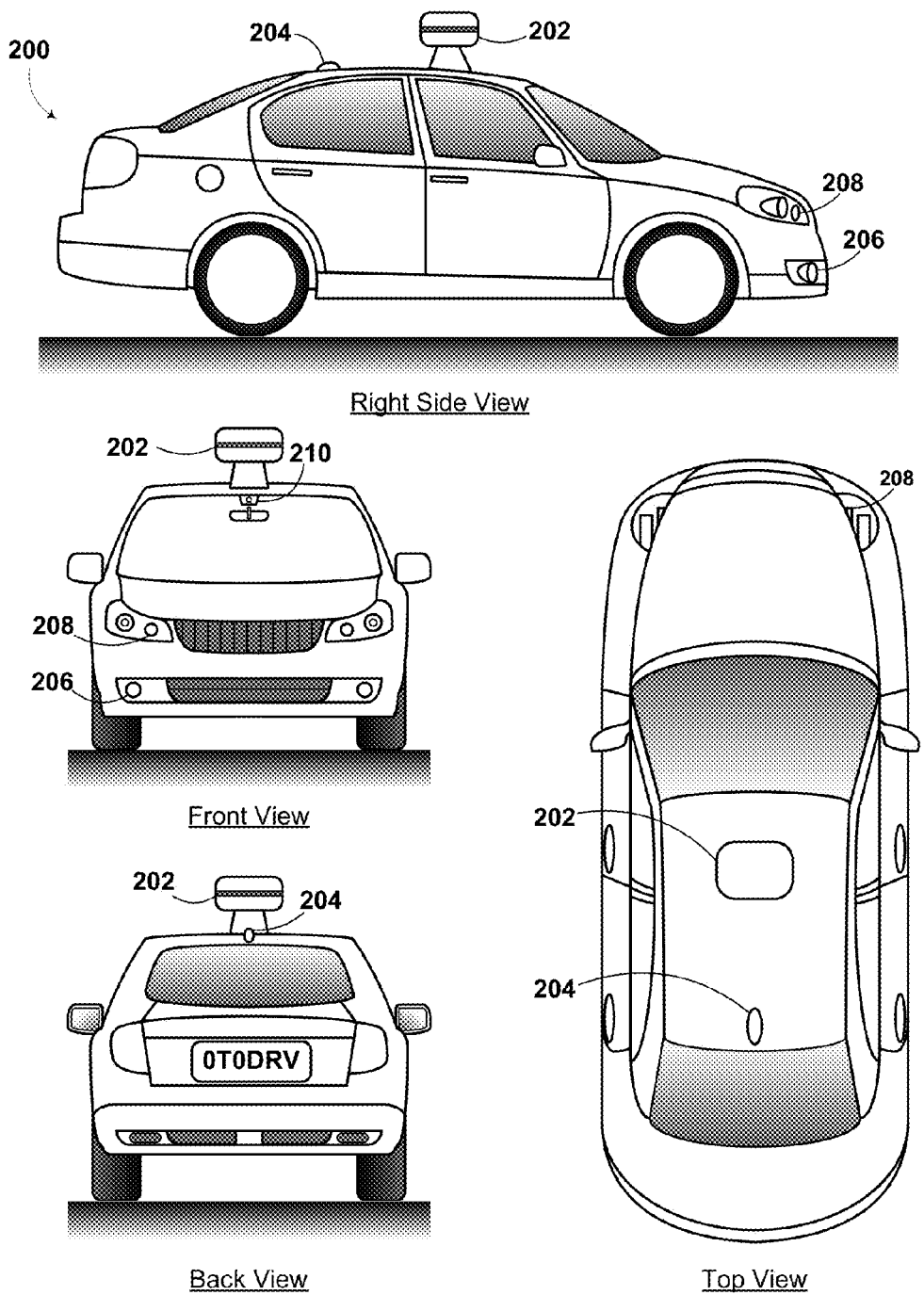
FIG. 2 depicts a vehicle, according to an example embodiment.

FIG. 2 shows a vehicle 200 that could be similar or identical to vehicle 100 described in reference to FIG. 1. In at least one embodiment, vehicle 200 includes the following sensor elements: a sensor unit 202, a wireless communication system 204, a LIDAR 206, a laser rangefinder 208, and a camera 210. In some embodiments, the sensor elements of vehicle 200, in combination perhaps with other sensor elements not described, constitute part of sensor system 104, as described with respect to FIG. 1. Although vehicle 200 is illustrated in FIG. 2 as a car, other embodiments are possible. For instance, the vehicle 200 could represent a truck, a van, a semi-trailer truck, a motorcycle, a bicycle, a golf cart, an off-road vehicle, or a farm vehicle, among other examples.

In at least one embodiment, the sensor unit 202, perhaps in conjunction with other sensor elements, is configured to capture information about an environment of the vehicle 200. For example, sensor unit 202 could include or communicatively couple with any combination of cameras, RADARs, LIDARs, range finders, and acoustic sensors. Other types of sensors are possible as well. In some embodiments, the sensor unit 202 includes one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3B:
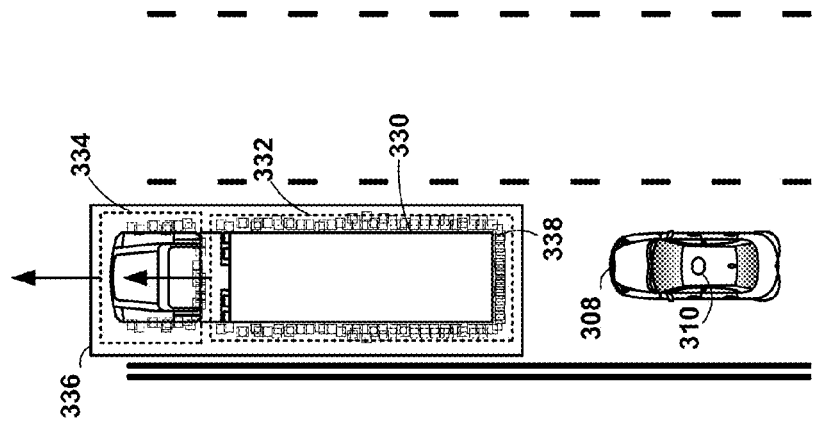
FIG. 3B is a vehicle-operating scenario, according to an example embodiment.
Figure 3A:
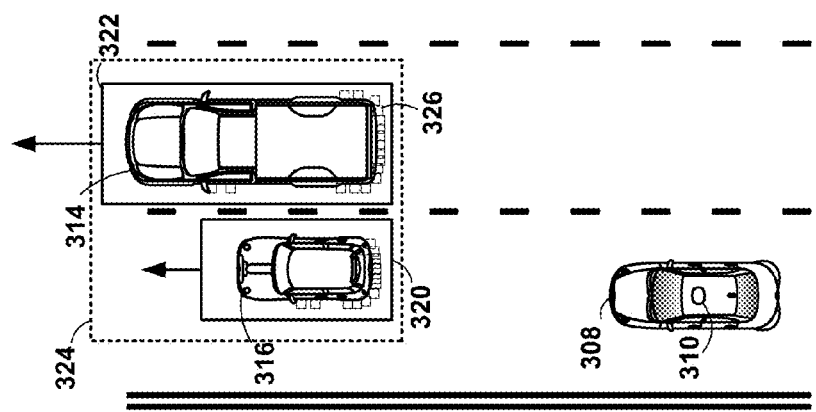
FIG. 3A is a vehicle-operating scenario, according to an example embodiment.

FIGS. 3A and 3B illustrate example scenarios in which vehicles are travelling on a roadway. In each scenario, the roadway is depicted as having two lanes, a left-hand lane and a right-hand lane, with traffic in each lane travelling the same direction. Depicted on the roadway in FIG. 3A is vehicle 308, car 316, and truck 314. And depicted on the roadway in FIG. 3B is vehicle 308 and semi-truck 330. In each scenario, vehicle 308 could be operating in an autonomous mode and collecting sensor data via sensor unit 310 and perhaps other sensor elements. In particular, a camera may capture a plurality of images of the environment for analysis by a controller of the vehicle 308. Alternatively or additionally, another sensor, such as a RADAR unit or a laser rangefinder/LIDAR unit may emit a series of signals and subsequently detect a series of signal reflections. In any case, based on the operation of sensor unit 310, vehicle 308 may collect a series of data points for analysis by the controller of vehicle 308. This analysis may reveal certain characteristics of each obstacle, including shape, orientation, heading, speed, distance between the given obstacle and the vehicle 308, and a distance between the given obstacle and other detected obstacles. Additional characteristics are possible as well.

For example, in the example scenario depicted in FIG. 3A, the sensor unit 310 has collected two clusters of data points: one cluster at the current position of vehicle 316 and another cluster at the current position of vehicle 314. These data points are depicted as small squares 326 and in some embodiments are collected by detecting the reflections of emitted RADAR or laser signals. Each cluster may be preliminarily classified by the vehicle 308 as an obstacle. However, upon an additional analysis, given the close proximity of the two obstacles and a similar speed of each obstacle, vehicle 308 may erroneously classify the two obstacles as one large obstacle 324 that spans the width of both lanes. The more accurate classification of the two obstacles, as revealed by FIG. 3A, is as two separate obstacles, 320 and 322.

Referring now to FIG. 3B, the sensor unit 310 has similarly collected two clusters of data points: one cluster located at the cab of the semi-truck 330 and another cluster located along the trailer of semi-truck 330. Again, these data points are depicted as small squares 338. Vehicle 308 may preliminarily classify each cluster of data points as an obstacle. However, upon an additional analysis, given the shape of the two obstacles, vehicle 308 may erroneously classify the two obstacles as two separate obstacles, 332 and 334. The more accurate classification of the two obstacles, as revealed by FIG. 3B, is that they are part of one large obstacle 336.

In either scenario, the erroneous classifications of (i) the two obstacles 320 and 322 as one large obstacle 324 and (ii) the one large obstacle 336 as two separate obstacles 332 and 334 may potentially confuse the pathing system of vehicle 308 as well as other control systems of vehicle 308. As a result of this confusion, the control systems of vehicle 308 may exit the autonomous mode and transition to a manual mode or take some other action for safety's sake. Therefore, to address situations like this and perhaps other situations, vehicle 308, in accordance with the embodiments described further herein, may engage in one or more advanced obstacle evaluation techniques in an effort to more accurately classify detected obstacles.

Generally, a vehicle, such as vehicle 308, may engage in at least one obstacle evaluation technique by comparing historical data collected for least two obstacles and determining, based on the historical data, whether the two obstacles have taken some action that is inconsistent with the two obstacles being parts of one large obstacle. Examples of such actions include (but are not limited to): a lane change, a speed differential, a changing orientation, a changing heading, etc. In accordance with one example evaluation technique, vehicle 308 collects data for two obstacles and analyzes the data to determine whether the two obstacles have had a changing differential distance between them. Typically, two obstacles that, at one point, were located at one distance from each other, but later are located at a different distance from each other are more likely to be two separate obstacles and less likely to be parts of one large obstacle. Whereas two obstacles that have, over time, maintained a relatively constant distance between them are more likely to be parts of one large obstacle and less likely to be two separate obstacles.

In at least one embodiment, vehicle 308 determines whether two obstacles have had a changing differential distance between them by determining whether there has been between the two obstacles a change in distance that is greater than or equal to a certain threshold distance. One way for the vehicle 308 to carry out such a measurement is to subtract the smallest measured distance between the two obstacles from the largest measured distance between the two obstacles. In cases in which the result is greater than or equal to the threshold distance, vehicle 308 may use such a measurement, either alone or in combination with other information as a basis to conclude that the two obstacles are two separate obstacles. And in cases in which the result is smaller than the threshold distance, vehicle 308 may use such a measurement, either alone or in combination with other information, as a basis to conclude that the two obstacles are parts of one large obstacle. This threshold distance may be, for example, five feet; however, any threshold distance (or units) can be used. Moreover, other ways of determining whether two obstacles have had between them a changing differential distance are possible as well.

In accordance with another example evaluation technique, vehicle 308 collects data for two obstacles and analyzes the data to determine whether the two obstacles have had different speeds. Typically, two obstacles that at one time were moving at different speeds are more likely to be two separate obstacles and less likely to be parts of one large obstacle. Whereas two obstacles that have, over time, comparatively maintained relatively similar speeds are more likely to be parts of one large obstacle and less likely to be two separate obstacles.

In at least one embodiment, vehicle 308 determines whether two obstacles have had different speeds by determining whether the two obstacles have had a speed differential that is greater than or equal to a certain threshold speed. In cases in which there was at one time or another measured between the two obstacles a difference in speed that is greater than or equal to the threshold speed, vehicle 308 may use such a measurement, either alone or in combination with other information, as a basis to conclude that the two obstacles are two separate obstacles. And in cases in which there was at no time measured between the two obstacles a difference in speed that is greater than or equal to the threshold speed, vehicle 308 may use such a measurement, either alone or in combination with other information, as a basis to conclude that the two obstacles are parts of one large obstacle. This threshold speed may be, for example, five MPH; however, any threshold speed (or units) can be used. Moreover, other ways of determining whether two obstacles have had different simultaneous speeds are possible as well.

In accordance with another example evaluation technique, vehicle 308 collects data for two obstacles and analyzes the data to determine whether the two obstacles have had different relative orientations or headings. Typically, two obstacles that at one time were facing different directions or had different relative headings are more likely to be two separate obstacles and less likely to be parts of one large obstacle. Whereas two obstacles that have, over time, comparatively maintained similar orientations or headings are more likely to be parts of one large obstacle and less likely to be two separate obstacles.

In at least one embodiment, vehicle 308 determines whether two obstacles have had different relative orientations or headings by determining whether the two obstacles have had a difference in orientation or heading that is greater than a certain threshold degree. In cases in which there was at one time or another measured between the two obstacles a difference in heading or orientation that is greater than or equal to the threshold degree, vehicle 308 may use such a measurement, either alone or in combination with other information, as a basis to conclude that the two obstacles are two separate obstacles. And in cases in which there was at no time measured between the two obstacles a difference in orientation or heading that is greater than or equal to the threshold degree, vehicle 308 may use such a measurement, either alone or in combination with other information, as a basis to conclude that the two obstacles are parts of one large obstacle. This threshold degree may be, for example, four degrees; however, any threshold degree (or units) can be used. Moreover, other ways of determining whether two obstacles have ever had different relative orientations or headings are possible as well.

In some embodiments, there may be situations in which it is advantageous for the vehicle 308 to change (i.e., increase or decrease) a certain threshold value in order to make the obstacle evaluation process more accurate (or for other reasons). Such situations may include (but are not limited to): when traffic conditions change (e.g., from congested to clear), when road conditions or weather changes (e.g., from dry to wet), when the type of roadway changes (e.g., from city to highway), when the time changes (e.g., from night to day), or for any other reason. A change in conditions such as these may be referred to as a change in "environmental conditions."

Figure 4:
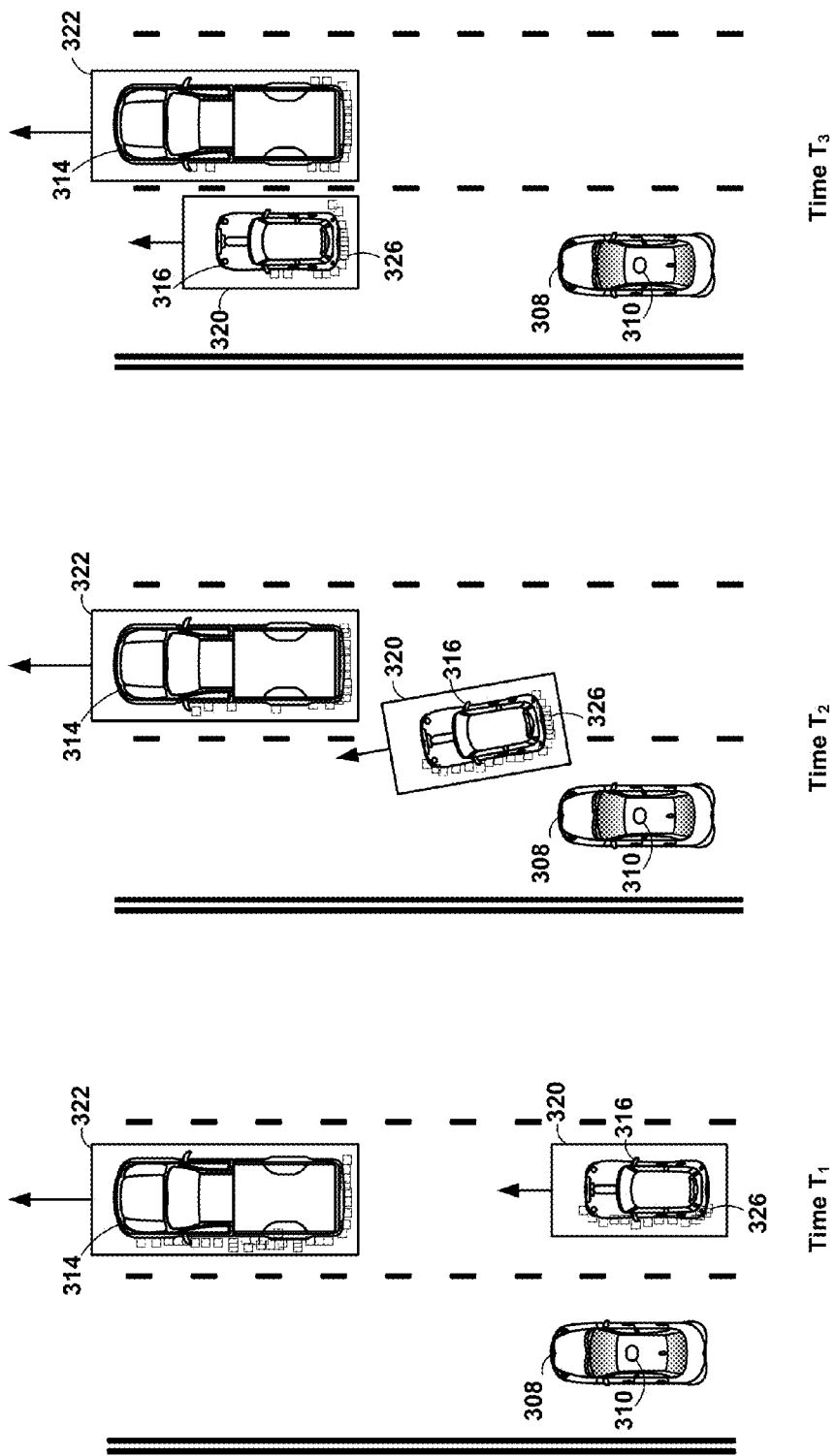
FIG. 4 is a vehicle-operating scenario, according to an example embodiment.

FIG. 4 depicts an example scenario in which vehicle 308 may engage in an obstacle evaluation technique, in accordance with an example embodiment. The scenario in FIG. 4 is depicted at three times, $T_1$, $T_2$, and $T_3$. At time $T_1$, vehicle 308 is traveling on a roadway in the left-hand lane, whereas car 316 and truck 314 are traveling on the roadway in the right-hand lane. Vehicle 308 is operating in an autonomous mode and collecting data via the sensor unit 310. In some embodiments (as explained above) the data is in the form of a plurality of data points, depicted in FIG. 4 as small squares 326. As depicted, one cluster of data points is detected at the position of car 316 and another cluster of data points is detected at the position of truck 314. At time $T_1$, the vehicle 308 may preliminarily classify one cluster as obstacle 320 and the other cluster as obstacle 322. Further, based on the collected data, vehicle 308 may determine that obstacle 320 is oriented in, and therefore traveling in, the same direction as obstacle 322, as indicated by the arrows protruding from each obstacle. Moreover, vehicle 308 may determine that each obstacle 320 and 322 is traveling at about 60 miles per hour (MPH), and are about twenty feet apart.

At time $T_2$, vehicle 308 may continue collecting sensor data for obstacles 320 and 322 and determine that, based on the data, obstacle 320 has increased its speed to 70 MPH and moved fifteen feet closer to obstacle 322 while at the same time changed its heading about five degrees to the left and begun to change lanes in front of vehicle 308. Further, based on the collected data, vehicle 308 may determine that obstacle 322 has maintained relatively the same heading and speed since time $T_1$.

Finally, at time $T_3$, vehicle 308 may continue collecting sensor data for obstacles 320 and 322 and determine that, based on the data, both obstacles 320 and 322 are traveling at about 60 MPH, maintaining about the same heading, and are about a few feet apart. At this time, vehicle 308 may engage in an obstacle evaluation technique, in accordance with at least some of the above-described procedures. For example, the vehicle 308 may analyze the history of collected data for obstacles 320 and 322 since time $T_1$, and determine that the obstacles have had between them (i) a change in distance of over fifteen feet, (ii) a maximum simultaneous speed differential of about ten MPH, and (iii) and a maximum heading or orientation differential of about five degrees. The vehicle 308 may further determine that at least one of these measurements exceeds a corresponding threshold. Therefore, vehicle 308 may use this determination, either alone or in combination with other information, as a basis to conclude that obstacles 320 and 322 are two separate obstacles. As a result of this conclusion, vehicle 308 may continue to maintain a cache of obstacle history data for each obstacle 320 and 322, as well as take any other action in accordance with the operation of vehicle 308 when it detects two separate obstacles.

Figure 5:
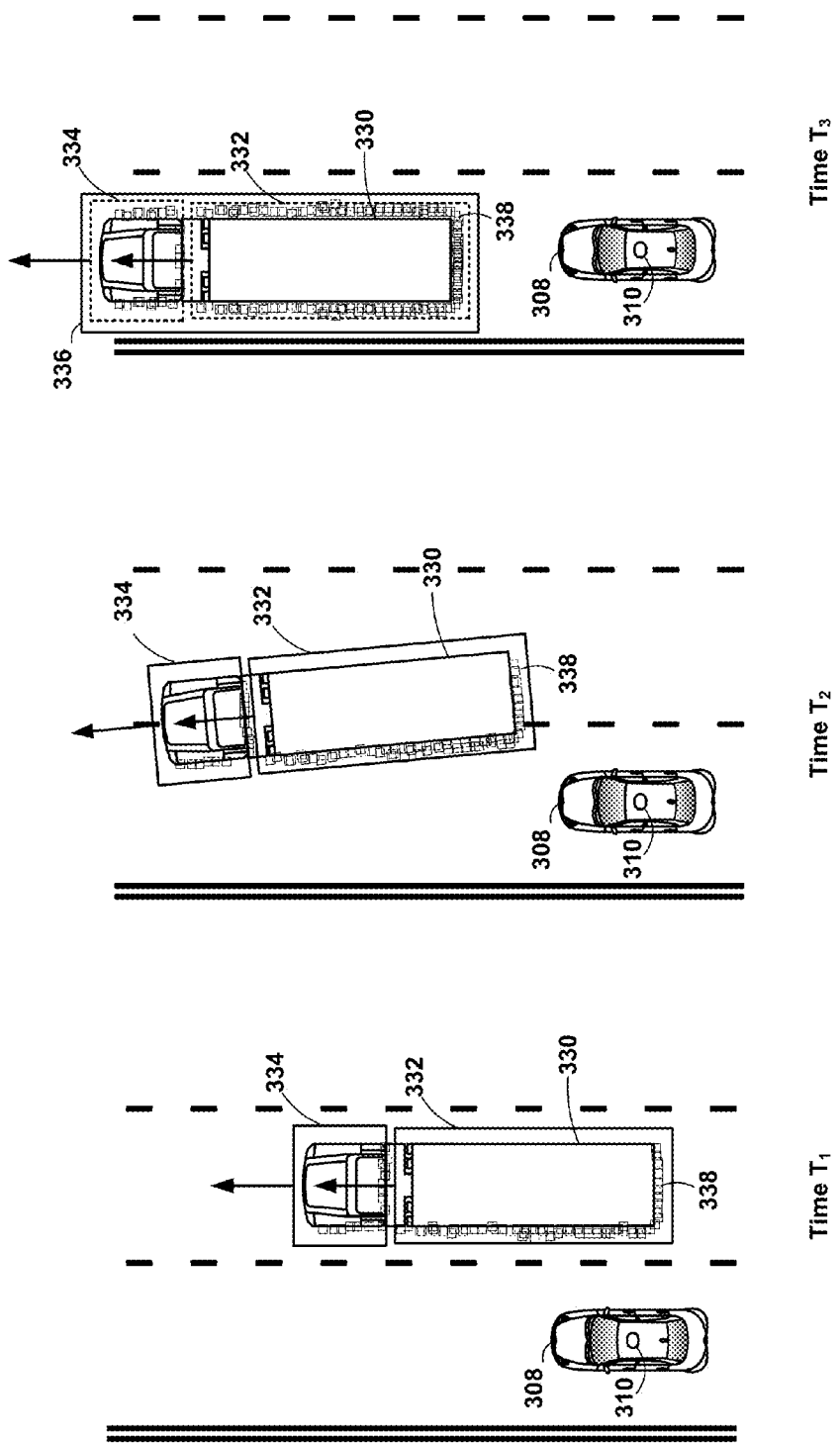
FIG. 5 is a vehicle-operating scenario, according to an example embodiment.

FIG. 5 depicts another example scenario in which vehicle 308 may engage in an obstacle evaluation technique, in accordance with an example embodiment. The scenario in FIG. 5 is depicted at three times, $T_1$, $T_2$, and $T_3$. At time $T_1$, vehicle 308 is traveling on a roadway in the left-hand lane, whereas semi-truck 330 is traveling on the roadway in the right-hand lane. Vehicle 308 is operating in an autonomous mode and collecting data points (depicted again as small squares 338) via the sensor unit 310. As depicted, one cluster of data points is detected at the position of the cab of semi-truck 330 and another cluster of data points is detected along the trailer of semi-truck 330. At time $T_1$, the vehicle 308 may preliminarily classify one cluster as obstacle 332 and the other cluster as obstacle 334. Further, based on the collected data, vehicle 308 may determine that each obstacle is oriented in, and therefore traveling in, the same direction, as indicated by the arrows protruding from each obstacle. Moreover, vehicle 308 may determine that each obstacle 332 and 334 is traveling at about the same speed (60 MPH), and about four feet apart.

At time $T_2$, vehicle 308 may continue collecting sensor data for obstacles 332 and 334 and determine that, based on the data, each obstacle has increased its speed to 70 MPH and each obstacle has changed its heading about five degrees to the left and begun to change lanes in front of vehicle 308. Further, based on the collected data, vehicle 308 may determine that each obstacle has maintained between them a relatively constant distance of four feet.

Finally, at time $T_3$, vehicle 308 may continue collecting sensor data for obstacles 320 and 322 and determine that, based on the data, both obstacles 332 and 334 have reduced their speeds to about 60 MPH, are maintaining about the same heading, and are still about four feet apart. At this time, vehicle 308 may engage in an obstacle evaluation technique, in accordance with at least some of the above-described procedures. For example, the vehicle 308 may analyze the history of collected data for obstacles 332 and 334 since time $T_1$, and determine that the obstacles have had between them (i) a relatively constant distance differential, (ii) a near-zero MPH speed differential, and (iii) and relatively similar simultaneous headings or orientations. The vehicle 308 may further determine that none of these measurements exceeds a corresponding threshold. Therefore, vehicle 308 may use this determination, either alone or in combination with other information, as a basis to conclude that obstacles 332 and 334 are parts of one large obstacle 336. As a result of this conclusion, vehicle 308 may merge the cache of obstacle history data for each obstacle 332 and 334, as well as take any other action in accordance with the operation of vehicle 308 when it detects one large obstacle.

The above-described scenarios are merely examples, and other scenarios in which a vehicle such as vehicle 308 may engage in an obstacle evaluation technique. For instance, in one scenario (not depicted) vehicle 308 may detect three or more obstacles (e.g., obstacles A, B, and C) and engage in an obstacle evaluation technique for each obstacle pair of the detected obstacles (e.g., A-B, A-C, and B-C). Still other examples are possible as well.

Figure 6:
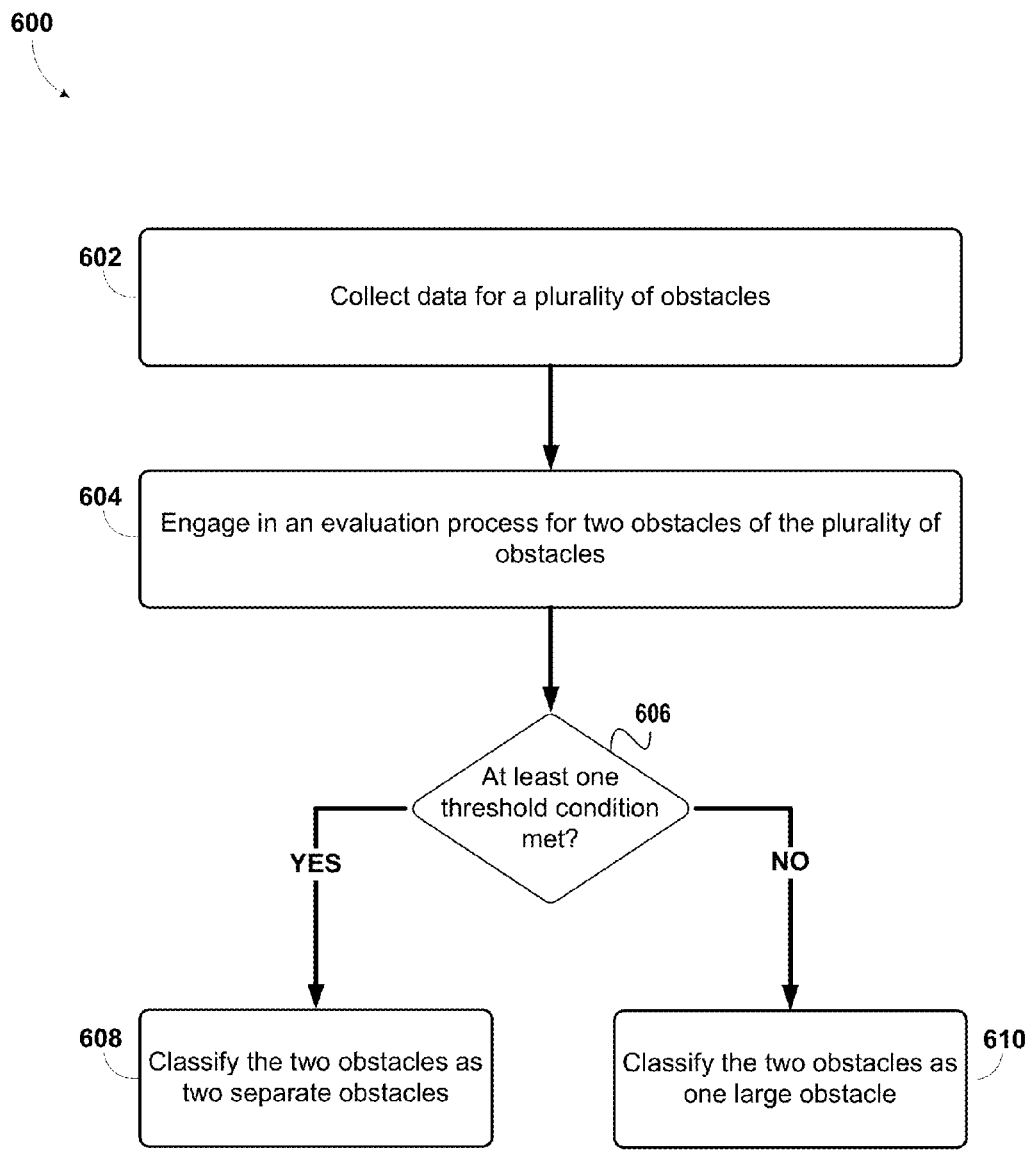
FIG. 6 depicts a flow diagram, according to an example embodiment.

FIG. 6 is a flow diagram 600 that depicts an example obstacle evaluation process. The example process may include one or more operations, functions, or actions, as depicted by one or more of blocks 602, 604, 606, 608, and/or 610, each of which may be carried out by any of the systems described by way of FIGS. 1-5; however, other configurations could be used.

Furthermore, those skilled in the art will understand that the flow diagram described herein illustrates functionality and operation of certain implementations of example embodiments. In this regard, each block of each flow diagram may represent a module, a segment, or a portion of program code, which includes one or more instructions executable by a processor (e.g., processor 113 in computer system 112 described above with respect to vehicle 100) for implementing specific logical functions or steps in the process. The program code may be stored on any type of computer readable medium (e.g., computer readable storage medium or non-transitory media, such as data storage 114 described above with respect to vehicle 100), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

As shown, the flow diagram 600 begins at block 602 where a vehicle collects data for a plurality of obstacles. As described above, at least one sensor element, such as a camera, RADAR, laser rangefinder/LIDAR, or other element may collect a series of data points for each obstacle. These data points may reveal various characteristics about each obstacle at the time in which the data was collected, including for example, the shape, orientation, heading, and speed of the obstacle, as well as distances between the obstacle and other obstacle or the vehicle itself. Other ways of collecting such data exists as well.

At block 604, the vehicle engages in an evaluation process for two obstacles of the plurality of obstacles. As described above, one way for a vehicle to engage in an evaluation process is to compare the data collected for the two obstacles and determine the extent to which the obstacles have changed their distance from one another, changed their speed relative to one another, and changed their orientation or heading relative to one another. Other ways to engage in an evaluation process are possible as well.

At block 606, the vehicle makes a determination of whether, based on the evaluation process, at least one threshold condition is met. For instance, in some embodiments, the vehicle may determine whether the obstacles have had between them a change in distance that is greater than or equal to a certain distance threshold. In some embodiments, the vehicle may determine whether the obstacles have had between them a differential speed that is greater than or equal to a certain speed threshold. And in some embodiments, the vehicle may determine whether the obstacles have had between them an orientation differential that is greater than or equal to an orientation threshold. The vehicle may engage in any number of other threshold-condition determinations as well.

If the vehicle determines that at least one threshold condition is met, the vehicle may use such a determination, either alone or in combination with other information, as a basis to proceed to block 608 and classify the two obstacles as two separate obstacles. If, however, the vehicle determines that no threshold conditions are met, the vehicle may use such a determination, either alone or in combination with other information, as a basis to proceed to block 610 and classify the two obstacles as one large obstacle. Other responsive actions are possible as well.

Example processes, such as the one depicted by flow diagram 600, as well as other example processes described herein, may be carried out in whole or in part by the vehicle and its subsystems. However, it should be understood that an example process may be implemented in whole or in part by other computing devices, such as those located remotely from the vehicle. For example, an example process may be implemented in whole or in part by a server system, which receives data from a device such as those associated with the vehicle. Other examples of computing devices or combinations of computing devices that can implement an example process are possible.

Figure 7:
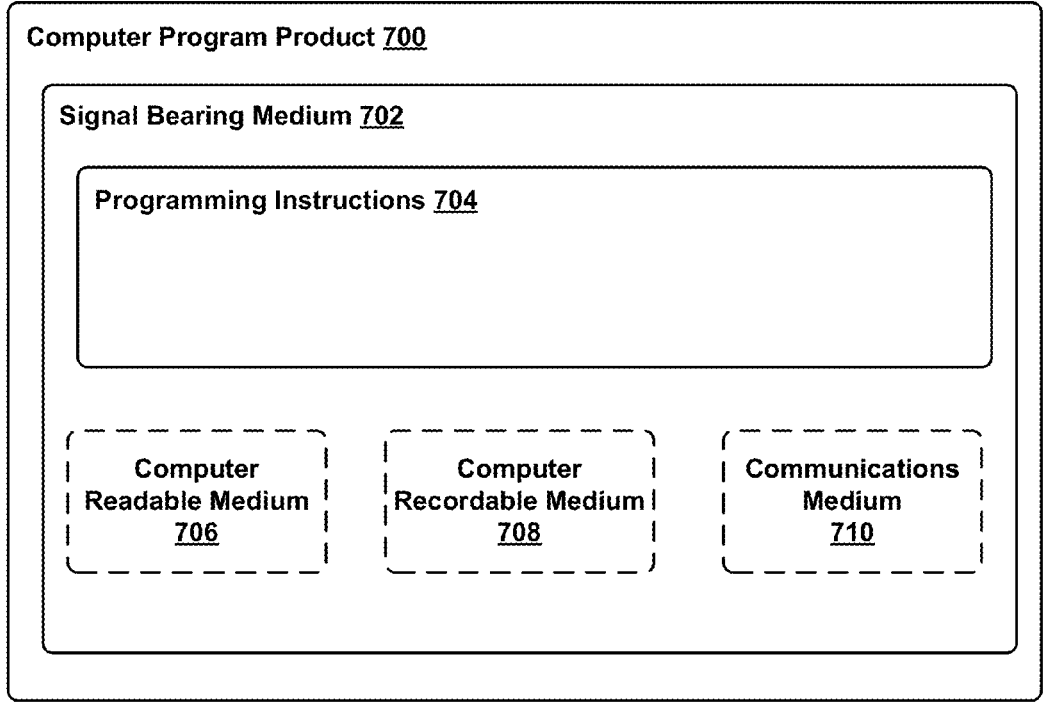
FIG. 7 is a schematic diagram of a computer program product, according to an example embodiment.

In some embodiments, processes described herein may be implemented as computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may encompass a computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 may be configured to provide various operations, functions, or actions in response to the programming instructions 704 conveyed to the processor 113 by one or more of the computer readable medium 706, the computer recordable medium 708, and/or the communications medium 710 (e.g., instructions 115 stored in data storage 114).

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and processes with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A vehicle comprising:
   at least one sensor;
   at least one processor; and
   data storage comprising instructions executable by the at least one processor to:
   receive from the at least one sensor data relating to a plurality of potential obstacles,
   conduct a first evaluation on at least a subset of the plurality of potential obstacles, the first evaluation including a first threshold comparison of the received data,
   classify the at least a subset of potential non-stationary obstacles as a single non-stationary obstacle when the first evaluation indicates that the first threshold comparison of the received data is not met,
   classify the at least a subset of potential obstacles as two separate non-stationary obstacles when the first evaluation indicates that at least one first threshold comparison of the received data is met;
   determine that one or more environmental conditions have changed and responsively changing the first threshold to a second threshold;
   conduct a second evaluation on at least a subset of the plurality of potential obstacles, the second evaluation including a second threshold comparison of the received data,
   classify the at least a subset of potential non-stationary obstacles as a single nonstationary obstacle when the second evaluation indicates that the second threshold comparison of the received data is not met,
   classify the at least a subset of potential obstacles as two separate non-stationary obstacles when the second evaluation indicates that at least one second threshold comparison of the received data is met.

2. The vehicle of claim 1, wherein at least one of the first and second evaluation comprises a determination of whether the at least a subset of potential non-stationary obstacles has had between them a change in distance that exceeds a distance threshold.

3. The vehicle of claim 1, wherein at least one of the first and second evaluation comprises a determination of whether the at least a subset of potential non-stationary obstacles has had between them a change in change in speed differential that exceeds a speed threshold.

4. The vehicle of claim 1, wherein at least one of the first and second evaluation comprises a determination of whether the at least a subset of potential non-stationary obstacles has had between them an orientation differential that exceeds an orientation threshold.

5. The vehicle of claim 1, wherein classifying the at least a subset of potential non-stationary obstacles as a single non-stationary obstacle comprises merging the received data that relates to the at least a subset of potential non-stationary obstacles.

6. The vehicle of claim 1, wherein at least one of the first and second evaluation comprises a respective evaluation of every at least a subset of potential non-stationary obstacles in the plurality of potential obstacles.

7. A method comprising:
   collecting data relating to a plurality of potential obstacles;

conducting a first evaluation on the at least a subset of the plurality of potential obstacles, the at least one first evaluation including a first threshold comparison of the received data, classifying the at least a subset of potential non-stationary obstacles as a single non-stationary obstacle when the first evaluation indicates that the first threshold comparison of the received data is not met, classifying the at least a subset of potential obstacles as two separate non-stationary obstacles when the first evaluation indicates that at least one first threshold comparison of the received data is met;

determining that one or more environmental conditions have changed and responsively changing the first threshold to a second threshold;

conducting a second evaluation on at least a subset of the plurality of potential obstacles, the second evaluation including a second threshold comparison of the received data, classifying the at least a subset of potential non-stationary obstacles as a single nonstationary obstacle when the second evaluation indicates that the second threshold comparison of the received data is not met, classifying the at least a subset of potential obstacles as two separate non-stationary obstacles when the second evaluation indicates that at least one second threshold comparison of the received data is met.

8. The method of claim 7, wherein at least one of the first and second evaluation comprises a determination of whether the at least a subset of potential non-stationary obstacles has had between them a change in distance that exceeds a distance threshold.

9. The method of claim 7, wherein at least one of the first and second evaluation comprises a determination of whether the at least a subset of potential non-stationary obstacles has had between them a change in change in speed differential that exceeds a speed threshold.

10. The method of claim 7, wherein at least one of the first and second evaluation comprises a determination of whether the at least a subset of potential non-stationary obstacles has had between them an orientation differential that exceeds an orientation threshold.

11. The method of claim 7, wherein classifying the at least a subset of potential non-stationary obstacles as a single non-stationary obstacle comprises merging the received data that relates to the at least a subset of potential non-stationary obstacles.

12. The method of claim 7, wherein at least one of the first and second evaluation comprises a respective evaluation of every at least a subset of potential non-stationary obstacles in the plurality of potential obstacles.

13. A non-transitory computer readable medium (CRM) having stored thereon instructions executable by a computing device to cause the computing device to perform functions, the functions comprising:

collecting data relating to a plurality of potential obstacles;

conducting a first evaluation on the at least a subset of the plurality of potential obstacles, the at least one first evaluation including a first threshold comparison of the received data, classifying the at least a subset of potential non-stationary obstacles as a single non-stationary obstacle when the first evaluation indicates that the first threshold comparison of the received data is not met, classifying the at least a subset of potential obstacles as two separate non-stationary obstacles when the first evaluation indicates that at least one first threshold comparison of the received data is met;

determining that one or more environmental conditions have changed and responsively changing the first threshold to a second threshold;

conducting a second evaluation on at least a subset of the plurality of potential obstacles, the second evaluation including a second threshold comparison of the received data, classifying the at least a subset of potential non-stationary obstacles as a single nonstationary obstacle when the second evaluation indicates that the second threshold comparison of the received data is not met, classifying the at least a subset of potential obstacles as two separate non-stationary obstacles when the second evaluation indicates that at least one second threshold comparison of the received data is met.

14. The CRM of claim 13, wherein at least one of the first and second evaluation comprises a determination of whether the at least a subset of potential non-stationary obstacles has had between them a change in distance that exceeds a distance threshold.

15. The CRM of claim 13, wherein at least one of the first and second evaluation comprises a determination of whether the at least a subset of potential non-stationary obstacles has had between them a change in change in speed differential that exceeds a speed threshold.

16. The CRM of claim 13, wherein at least one of the first and second evaluation comprises a determination of whether the at least a subset of potential non-stationary obstacles has had between them an orientation differential that exceeds an orientation threshold.

17. The CRM of claim 13, wherein classifying the at least a subset of potential non-stationary obstacles as a single non-stationary obstacle comprises merging the received data that relates to the at least a subset of potential non-stationary obstacles.

18. The CRM of claim 13, wherein at least one of the first and second evaluation comprises a respective evaluation of every at least a subset of potential non-stationary obstacles in the plurality of potential obstacles.

* * * * *